(12) United States Patent
Yao

(10) Patent No.: US 10,493,881 B2
(45) Date of Patent: Dec. 3, 2019

(54) CAR SEAT COVER AND A METHOD FOR KNITTING THE SAME

(71) Applicant: Yuan Yao, Hangzhou (CN)

(72) Inventor: Yuan Yao, Hangzhou (CN)

( * ) Notice: Subject to any disclaimer, the term of this patent is extended or adjusted under 35 U.S.C. 154(b) by 0 days.

(21) Appl. No.: 15/485,705

(22) Filed: Apr. 12, 2017

(65) Prior Publication Data
US 2018/0201167 A1 Jul. 19, 2018

(30) Foreign Application Priority Data

Jan. 18, 2017 (CN) .......................... 2017 1 0037191

(51) Int. Cl.
*D04B 1/22* (2006.01)
*A47C 31/00* (2006.01)
*B60N 2/60* (2006.01)
*B60N 2/58* (2006.01)
*B60N 2/80* (2018.01)

(52) U.S. Cl.
CPC ......... *B60N 2/6018* (2013.01); *B60N 2/5891* (2013.01); *B60N 2/80* (2018.02); *D04B 1/22* (2013.01); *D10B 2403/0112* (2013.01); *D10B 2403/0332* (2013.01); *D10B 2505/08* (2013.01); *Y02P 70/633* (2015.11)

(58) Field of Classification Search
CPC ..... A41D 2500/10; A47C 31/11; A47C 7/021; B60N 2/60; B60N 2/58; B32B 5/024; D04B 1/00; D04B 1/02; D04B 1/16; D04B 1/20; D04B 1/22; D04B 1/28; D04B 1/24; D04B 21/10
See application file for complete search history.

(56) References Cited

U.S. PATENT DOCUMENTS 4,232,898 A * 11/1980 Bodrero ............... B60N 2/6027
297/224
4,389,442 A * 6/1983 Pickens, Jr. ............. B32B 27/12
428/92

(Continued)

*Primary Examiner* — Shin H Kim
(74) *Attorney, Agent, or Firm* — Jiwen Chen

(57) ABSTRACT

The present invention relates to a car seat cover and a method for knitting the same. The car seat cover comprises a headrest portion, a backrest portion and a seat cushion portion; the headrest portion comprises a front headrest piece and a rear headrest piece which are connected, a lower opening of the headrest portion being tightened; the backrest portion comprises a front backrest piece and a rear backrest piece which are connected, the front backrest piece being knitted by cubic knitting, sides of the backrest being knitted by Short Row and by adjusting the knitting tightness; and the seat cushion portion comprises a front seat cushion piece and a rear seat cushion piece which are connected, a seat cushion skirt portion being knitted by cubic knitting, and sides of the seat cushion being knitted by Short Row and by adjusting the knitting tightness. By knitting a seat cover by cubic knitting, the resulting products are cubic. Compared with the traditional way of wrapping a seat by stitching and splicing, the cover will fit the surface of the seat better. The procedures of knitting, dyeing, combining, cutting and stitching are reduced, the generation of scraps is avoided, and high degree of automation, high production efficiency, environmental protection, and reliable quality are realized.

10 Claims, 3 Drawing Sheets

(56) References Cited

U.S. PATENT DOCUMENTS

| | | | | |
|---|---|---|---|---|
| 4,400,030 A * | 8/1983 | Maruzzo | B60N 2/6036 | 297/224 |
| 5,005,901 A * | 4/1991 | Hinde | B60N 2/6036 | 297/220 |
| 5,009,946 A * | 4/1991 | Hatomoto | B32B 7/02 | 428/87 |
| 5,234,252 A * | 8/1993 | Wallach | B60N 2/6036 | 297/220 |
| 5,474,329 A * | 12/1995 | Wade | B60R 21/06 | 280/749 |
| 5,711,169 A * | 1/1998 | Leeke | B60N 2/5833 | 5/653 |
| 5,803,539 A * | 9/1998 | Dewar | B60N 2/6054 | 297/228.1 |
| D419,025 S * | 1/2000 | Lindberg | D6/610 | |
| 6,050,639 A * | 4/2000 | Horn | B60N 2/5875 | 297/229 |
| 6,131,995 A * | 10/2000 | Smith | B60N 2/6063 | 297/118 |
| 6,309,017 B1 * | 10/2001 | Middleton | A47C 31/113 | 297/219.1 |
| 6,345,866 B1 * | 2/2002 | Jackson | A47C 31/11 | 297/224 |
| 6,447,059 B1 * | 9/2002 | Jackson | A47C 31/11 | 297/188.06 |
| D480,253 S * | 10/2003 | Raines | D6/617 | |
| 7,172,246 B1 * | 2/2007 | Itakura | A47C 31/116 | 297/219.1 |
| 7,419,213 B2 * | 9/2008 | Itakura | B60N 2/6036 | 297/219.1 |
| 7,448,681 B1 * | 11/2008 | Spitzer | A47C 31/11 | 2/69 |
| 7,600,813 B2 * | 10/2009 | Lanham | B60N 2/6018 | 297/219.1 |
| 7,695,066 B2 * | 4/2010 | Guercia | A47C 31/11 | 297/219.1 |
| 8,500,199 B2 * | 8/2013 | Paulin | A47B 13/083 | 297/219.1 |
| 9,062,401 B2 * | 6/2015 | Matsushima | A41H 37/003 | |
| D785,372 S * | 5/2017 | Bosket, Sr. | D6/611 | |
| 9,648,960 B2 * | 5/2017 | Scales | H05K 999/99 | |
| 2003/0106346 A1 * | 6/2003 | Matsumoto | D04B 21/10 | 66/195 |
| 2004/0130193 A1 * | 7/2004 | Haller | A47C 31/113 | 297/229 |
| 2005/0274298 A1 * | 12/2005 | Paulin | A47B 13/083 | 108/90 |
| 2006/0103195 A1 * | 5/2006 | Stanley | A47C 7/386 | 297/220 |
| 2007/0132290 A1 * | 6/2007 | Moshopoulos | A47C 7/386 | 297/220 |
| 2007/0145797 A1 * | 6/2007 | Itakura | A47C 31/116 | 297/228.1 |
| 2007/0157355 A1 * | 7/2007 | Katsin | A47C 31/113 | 2/22 |
| 2008/0093901 A1 * | 4/2008 | Hodge | B60N 2/6036 | 297/220 |
| 2008/0191529 A1 * | 8/2008 | Guercia | A47C 31/11 | 297/229 |
| 2010/0019556 A9 * | 1/2010 | Spitzer | A47C 31/11 | 297/228.1 |
| 2012/0187732 A1 * | 7/2012 | Lerm | A47C 7/744 | 297/219.12 |
| 2012/0200130 A1 * | 8/2012 | Brinker | A47C 31/11 | 297/220 |
| 2012/0246889 A1 * | 10/2012 | Matsushima | A41H 37/003 | 24/430 |
| 2012/0313410 A1 * | 12/2012 | Paulin | A47B 13/083 | 297/219.1 |
| 2013/0320720 A1 * | 12/2013 | Steinmetz | A47C 7/62 | 297/219.1 |
| 2016/0066698 A1 * | 3/2016 | Longshore | A47C 1/14 | 297/224 |
| 2016/0108564 A1 * | 4/2016 | Topolkaraev | D01D 5/247 | 442/194 |
| 2018/0135214 A1 * | 5/2018 | Sakai | D03D 15/00 | |

* cited by examiner

CAR SEAT COVER AND A METHOD FOR KNITTING THE SAME

This application claims the priority benefit of Chinese Application No. 201710037191.2 filed Jan. 18, 2017, which is hereby incorporated by reference.

TECHNICAL FIELD OF THE INVENTION

The present invention relates to the technical field of knitting, and in particular to a car seat cover and a method for knitting the same.

BACKGROUND OF THE INVENTION

The existing car seat covers are usually produced by cutting and stitching. Specifically, an existing car seat cover is produced by cutting materials into pieces of sizes corresponding to the size of a car seat, and then stitching those pieces together.

For a seat cover produced in this way, cutting the fabric is labor intensive and causes significant waste.

Producing a car seat cover by stitching is low in the degree of automation, labor intensive and wastes material resources, and is low in the production efficiency. Moreover, the quality of the produced car seat covers varies greatly due to manual stitching.

SUMMARY OF THE INVENTION

A technical problem to be solved in the present invention is to provide a car seat cover which is knitting by cubic knitting with saved fabric, high knitting efficiency and reliable quality.

The present invention employs the following technical solutions to solve the above technical problem.

A car seat cover is provided, comprising a headrest portion, a backrest portion and a seat cushion portion;

the headrest portion comprises a front headrest piece and a rear headrest piece which are connected, a lower opening of the headrest portion being tightened; and the backrest portion comprises a front backrest piece and a rear backrest piece which are connected, the front backrest piece being knitted by cubic knitting, sides of the front backrest piece being knitted by Short Row and by adjusting the knitting tightness. Short Row is a way of narrowing, also known as returning knitting.

The seat cushion portion comprises a front seat cushion piece and a seat cushion skirt portion which are connected, the seat cushion skirt portion being knitted by cubic knitting, and sides of the seat cushion skirt portion being knitted by Short Row and by adjusting the knitting tightness.

Beneficial effects: cubic knitting is a method of knitting in which the thickness or unevenness of the fabric is increased by stuffing loose yarn during the knitting by using a flat knitting machine and a jacquard pattern as a basic tissue, while giving the fabric itself a cubic radian in a way of narrowing by returning knitting.

Knitting a seat cover by cubic knitting greatly reduces the manual stitching procedures, allows the seat cover to be thick where it is expected to be thick and to be thin where it is expected to be thin, and knits the seat cover by double-sided knitting where it is expected to be knitted by double-sided knitting and by single-sided knitting where it is expected to be knitted by single-sided knitting. The resulting seat cover is rich in color and is integrally knitted. The use amount of the fabric is saved. High degree of automation, high knitting efficiency and reliable quality are realized.

Further, the front headrest piece is knitted by cubic knitting, and the bottom of the headrest is provided with an elastic band or is tightened by rib knitting; and the rear headrest piece and the front headrest piece are stitched together or integrally knitted; and the bottom of the rear headrest piece is provided with an elastic band or is tightened by rib knitting.

The front headrest piece and the rear headrest piece are integrally knitted by cubic knitting, and a lower opening of the headrest portion is tightened by an elastic band or by rib knitting.

The beneficial effects of using the further technical solutions are as follow: the headrest is integrally knitted by cubic knitting, or, the front headrest piece is first knitted and then stitched to the rear headrest piece. The use amount of the fabric is saved. High degree of automation, high knitting efficiency and reliable quality are realized.

Further, the rear backrest piece and the front backrest piece are integrally knitted or stitched together; and the bottom of the rear backrest piece is provided with an elastic band or is knitted by rib knitting, in order to tighten the bottom of the rear backrest piece.

The beneficial effects of using the further technical solutions are as follow: the backrest is integrally knitted by cubic knitting, or, the front backrest piece is first knitted and then stitched to the rear backrest piece. The use amount of the fabric is saved. High degree of automation, high knitting efficiency and reliable quality are realized.

Further, the bottom edge of the seat cushion skirt portion is provided with an elastic band for the purpose of tightening or is tightened by rib knitting.

The beneficial effects of using the further technical solutions are as follow: the elastic band may be stitched, or the elastic band may be integrally knitted with the seat cushion skirt portion, or the seat cushion skirt portion may be tightened by high-tightness rib knitting.

Further, a connecting piece is integrally connected between the front backrest piece and the front seat cushion piece, the connecting piece is put into a gap between the backrest of the seat and the seat portion to fix the car seat cover.

The beneficial effects of using the further technical solutions are as follow: the connecting piece is knitted by a flat knitting machine, the connecting piece connects the front backrest piece and the front seat cushion piece together, and the connecting piece, the front backrest piece and the front seat cushion piece are integrally knitted. There are two methods: thin and highly elastic tissues are selected as the connecting piece, and the middle portion is knitted into different lengths by the front and rear hooked needle plates, resulting in a bump effect. The bump portion may be put into a gap between the backrest of the seat and the seat to fix the seat cover, during the mounting of the seat cover. Thin and highly elastic tissues of the front backrest piece and the front seat cushion piece are selected as the connecting piece, and during the mounting, a PVC tube or a foam rod may be put into the gap between the backrest of the seat and the seat to fix the seat cover.

Further, the backrest portion and the seat cushion portion are knitted by hybrid double-sided and single-sided knitting, or an uneven surface is knitted in a manner of producing unevenness by stuffing loose yarn;

a number of pre-opening positions are formed on the car seat cover, the pre-opening positions being a single-sided knitted structure;

a non-slip coating is provided on the back face of the car seat cover by screen printing or drip molding; and a number of Velcro tapes are further provided on the car seat cover, the two ends of the Velcro tape being hook sides of the Velcro tape, and the middle portion being connected by an elastic band.

The beneficial effects of using the further technical solutions are as follow: since a car seat cover is knitted by hybrid double-sided and single-sided knitting or an uneven surface is knitted in a manner of producing unevenness by stuffing loose yarn, it is beautiful in appearance, and also the fitting of the seat cover to the seat and to the human body can be improved so that a better use experience is ensured. Opening positions are reserved according to different seat shapes corresponding to different models, so that the user can decide by himself/herself whether to get openings at the opening positions as desired. Since the non-slip coating is applied on the back of the seat cover, and after the user cuts along the pre-opening positions, the yarns will not suffer from puffed selvedge, and the cuts remain flat. Meanwhile, after the user cuts along the pre-opening positions, the openings can be further tied together by the Velcro tapes. Accordingly, the purpose of further improving the degree of wrapping, fitness and stability of the seat cover is achieved. Meanwhile, the non-slip coating may be made of rubber materials such as silica gel, so that the seat cover will not slip and offset due to the movement of the human body when in use.

A method for knitting a car seat cover is provided, comprising:

knitting a headrest portion by cubic knitting, a lower opening of the headrest portion being tightened and being releasable;

knitting a front backrest piece by cubic knitting, sides of the front backrest piece being knitted by Short Row and by adjusting the knitting tightness;

connecting a rear backrest piece to the two sides of the front backrest piece;

connecting a front seat cushion piece to a lower portion of the front backrest piece; and knitting a seat cushion skirt portion at an edge of the front seat cushion piece by cubic knitting, sides of the seat cushion skirt portion being knitted by Short Row and by adjusting the knitting tightness.

the two sides of the front backrest piece and the rear backrest piece are stitched together; or the front backrest piece and the rear backrest piece are integrally knitted.

The method further comprises a step of knitting a connecting piece: knitting a connecting piece in a lower portion of the front backrest piece, and knitting a front seat cushion piece in a lower portion of the connecting piece.

BRIEF DESCRIPTION OF THE DRAWINGS

FIG. 7 is a schematic structure diagram of pre-opening positions, in which:

A: front headrest piece;
B: rear headrest piece;
C: front backrest piece;
D: rear backrest piece;
E: front seat cushion piece;
F: seat cushion skirt portion;
G: connecting piece;
H: pre-opening positions;
I: Velcro tape;
J: single-sided knitted structure; and
K: double-sided knitted structure

DETAILED DESCRIPTION OF THE INVENTION

The principle and features of the present invention will be described below with reference to the accompanying drawings. The listed examples are merely used for explaining the present invention, not for limiting the scope of the present invention.

Embodiment 1

Figure 1:
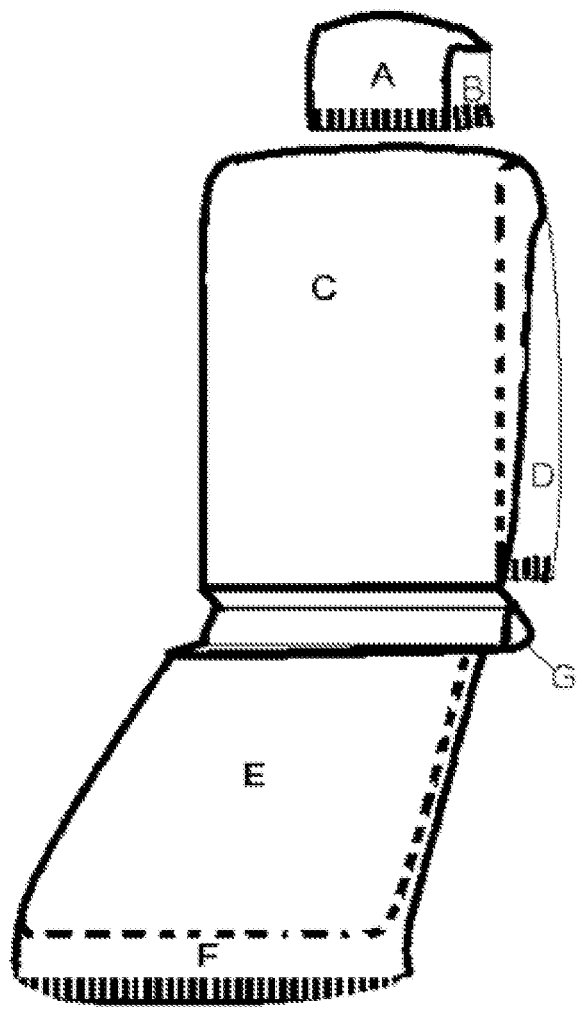
FIG. 1 is a schematic view of a car seat cover according to Embodiment 1.

FIG. 1 shows a method for producing a bump effect for the connecting piece of the car seat cover, and the rear backrest piece and the front backrest piece are stitched together. The car seat cover comprises a headrest portion, a backrest portion and a seat cushion portion.

The headrest portion comprises a front headrest piece and a rear headrest piece which are connected, a lower opening of the headrest portion being tightened. The front headrest piece is knitted by cubic knitting, and the bottom of the headrest is provided with an elastic band or is tightened by rib knitting; or, the front headrest piece and the rear headrest piece are integrally knitted by cubic knitting, and a lower opening of the headrest portion is tightened by an elastic band or by rib knitting.

The backrest portion comprises a front backrest piece and a rear backrest piece which are connected, the front backrest piece being knitted by cubic knitting, sides of the front backrest piece being knitted by Short Row and by adjusting the knitting tightness; and the rear backrest piece and the front backrest piece are stitched together. The bottom of the rear backrest piece is provided with an elastic band or is knitted by rib knitting, in order to tighten the bottom of the rear backrest piece.

The seat cushion portion comprises a front seat cushion piece and a seat cushion skirt portion which are connected, the seat cushion skirt portion being knitted by cubic knitting, and sides of the seat cushion skirt portion being knitted by Short Row and by adjusting the knitting tightness.

A connecting piece is integrally connected between the front backrest piece and the front seat cushion piece. The connecting piece is knitted into different lengths by the front and rear hooked needle plates, resulting in a bump effect. The bump portion is put into a gap between the backrest of the seat and the seat to fix the seat cover, during the mounting of the seat cover. The bottom edge of the seat cushion skirt portion is provided with an elastic band for the purpose of tightening or is tightened by rib knitting.

Both the backrest portion and the seat cushion portion may be knitted by hybrid double-sided and single-sided knitting to produce an uneven surface or in a manner of producing unevenness by stuffing loose yarn. It is beautiful in appearance, and also the fitting of the seat cover to the seat and to the human body can be improved so that a better use experience is ensured.

Embodiment 2

Figure 2:
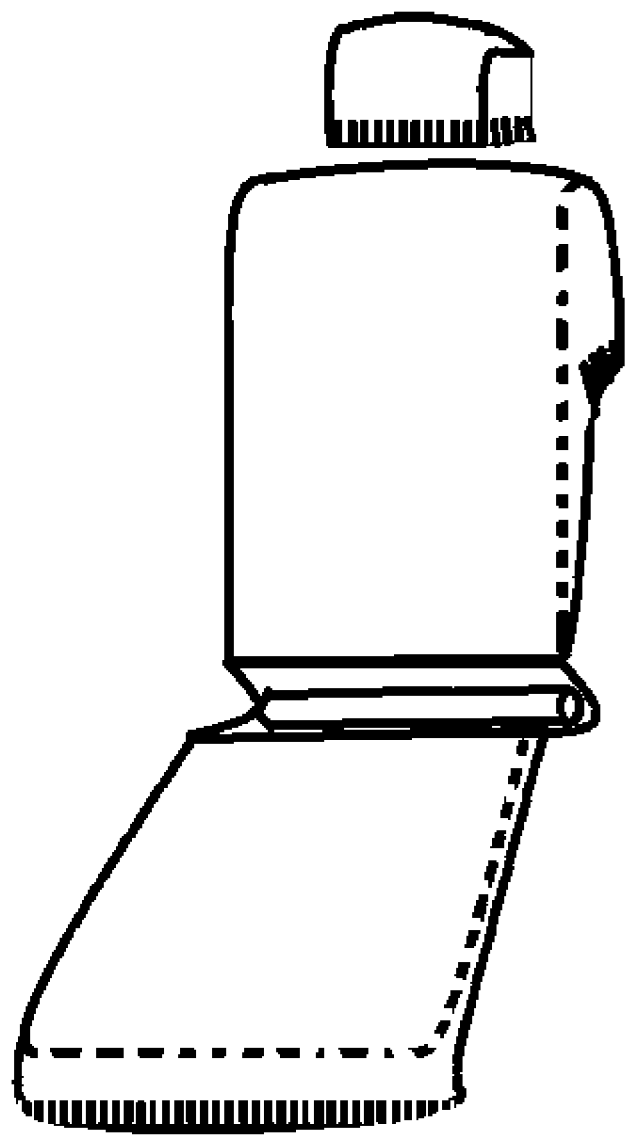
FIG. 2 is a schematic view of a car seat cover according to Embodiment 2.
Figure 3:
FIG. 3 is a schematic view of single-sided knitting.
Figure 4:
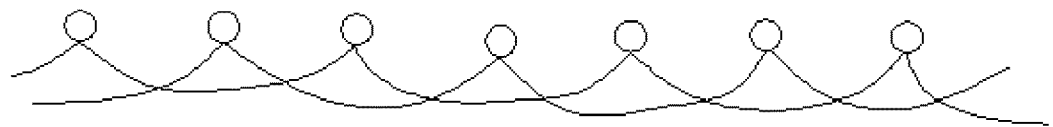
FIG. 4 is a schematic view of thickened (jacquard) single-sided knitting.
Figure 5:
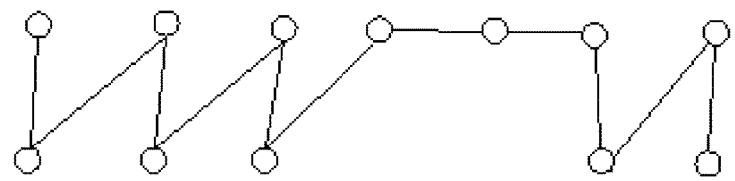
FIG. 5 is a schematic view of a knitting method combining double-sided knitting and single-sided knitting.
Figure 6:
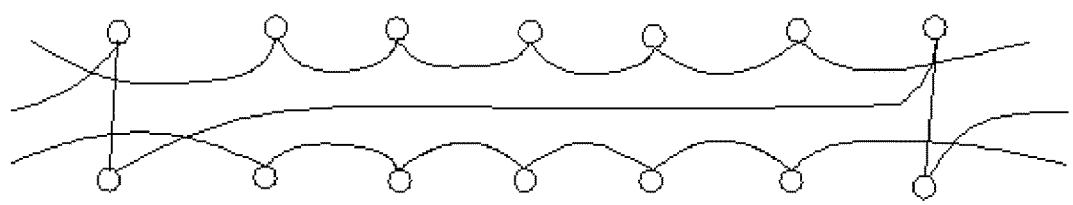
FIG. 6 is a schematic view of a knitting method of producing unevenness by loose yarn.

As shown in FIG. 2, the structure of Embodiment 2 is similar to that of Embodiment 1 except that the connecting piece integrally connects the front backrest piece and the front seat cushion piece, and during the mounting, a PVC tube or a foam tube may be put into the gap between the backrest of the seat and the seat to fix the seat cover. The rear backrest piece and the front backrest piece are integrally knitted.

Figure 7:
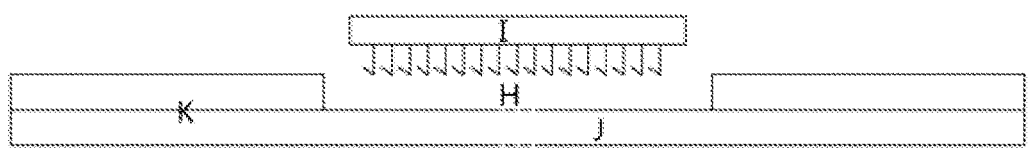

As shown in FIG. 7, the pre-opening positions are a single-sided knitted structure, while portions of the seat cover around and connected to the pre-opening positions are a double-sided knitted structure. The user can cut along the opening positions as desired. In this way, the elasticity or extension capability of this portion of the seat cover is increased, or points for fastening or tying the seat cover are increased artificially. When such openings are not required, they can be tied up directly by the Velcro tapes. Since the knit fabric and the Velcro tape are highly viscous, openings tied up by Velcro tapes look almost the same as those before being cut.

In this embodiment, a non-slip coating is provided on the back of the seat cover to enhance the slip resistance between the seat cover and the seat. When the seat cover is mounted, it is fixed by Velcro tapes. Since the hook side of the Velcro tape can be directly fitted with the knit fabric, the Velcro tape can be fixed on almost any portion of the seat cover. This makes the mounting of the seat cover more convenient, and the stability of the mounted seat cover is improved.

The way of stuffing loose yarn in cubic knitting will be described below with reference to FIGS. 3-6.

Definition of cubic knitting: cubic knitting is a method of knitting in which the thickness or unevenness of the fabric is increased by stuffing loose yarn during the knitting by using a flat knitting machine and a jacquard pattern as a basic tissue, while giving the fabric itself a cubic radian in a way of narrowing by returning knitting.

In those figures, each ring represents a knitted knot. The way of stuffing loose yarn in cubic knitting is as shown in FIGS. 3-6. At least one loose yarn is located between pieces of double-sided fabric or behind a piece of single-sided fabric. The length of the knitting thread may be set as required. Due to the fluffy property of loose yarn, the thickness of the fabric may be set as required or unevenness may be produced. The fabric itself is given a cubic radian in a way of narrowing by returning knitting. The knitted seat cover is thick where it is expected to be thick and thin where it is expected to be thin, and is double-sided knitted where it is expected to be knitted by double-sided knitting and single-sided knitted where it is expected to be knitted by single-sided knitting. Wherein, the bump portion is formed by knitting a bag tissue by using front and rear hooked needle plates during the knitting process, and then filling the hollow portion of the front fabric piece and the rear fabric piece of the bag with loose yarn. The thickness of the bag tissue is increased due to the fluffy property of the loose yarn. The recess portion is not filled with loose yarn, and instead, it is knitted from yarns originally located in the hollow portion by using front and rear hooked needle plates. Because of participating in knitting, the yarns are compressed by the front fabric piece and the rear fabric piece, and the fluffy property of the yarns is inhibited. Compared with the thickness of the bump portion, the thickness of the recess portion is significantly reduced. As yarns for the purpose of filling, yarns, such as non-twist yarns and textured yarns, which have excellent fluffy effect, are usually used.

Compared with the traditional way of wrapping a seat by elastic materials (such as sponge), the car seat cover of the present invention will fit the surface of the seat better.

At last, the foregoing descriptions are merely preferred embodiments of the present invention, not used for limiting the present invention. Any modifications, equivalent replacements and improvements made within the spirit and principle of the present invention shall be included in the protection scope of the present invention.

The invention claimed is:

1. A car seat cover, comprising a headrest portion, a backrest portion and a seat cushion portion;
   the headrest portion comprises a front headrest piece and a rear headrest piece which are connected, a lower opening of the headrest portion being tightened;
   the backrest portion comprises a front backrest piece and a rear backrest piece which are connected, the front backrest piece being knitted by cubic knitting, sides of the front backrest piece being knitted by return knitting and by adjusting the knitting tightness; and
   the seat cushion portion comprises a front seat cushion piece and a seat cushion skirt portion which are connected, the seat cushion skirt portion being knitted by cubic knitting, and sides of the seat cushion skirt portion being knitted by return knitting and by adjusting the knitting tightness;
   wherein the backrest portion and the seat cushion portion are knitted by hybrid double-sided and single-sided knitting, or an uneven surface is knitted in a manner of producing unevenness by stuffing loose yarn;
   a number of pre-opening positions are formed on the car seat cover, the pre-opening positions being a single-sided knitted structure; and
   a number of hook and loop fastening tapes are further provided on the car seat cover to tie up the pre-opening positions on the car seat cover.

2. The car seat cover according to claim 1, characterized in that the front headrest piece is knitted by cubic knitting, and the bottom of the headrest is provided with an elastic band or is tightened by rib knitting; and
   the rear headrest piece and the front headrest piece are stitched together or integrally knitted; and the bottom of the rear headrest piece is provided with an elastic band or is tightened by rib knitting.

3. The car seat cover according to claim 1, characterized in that the front headrest piece and the rear headrest piece are integrally knitted by cubic knitting, and a lower opening of the headrest portion is tightened by an elastic band or by rib knitting.

4. The car seat cover according to claim 1, characterized in that the rear backrest piece and the front backrest piece are integrally knitted or stitched together; and
   the bottom of the rear backrest piece is provided with an elastic band or is knitted by rib knitting, in order to tighten the bottom of the rear backrest piece.

5. The car seat cover according to claim 1, characterized in that an bottom edge of the seat cushion skirt portion is provided with an elastic band for the purpose of tightening or is tightened by rib knitting.

6. The car seat cover according to claim 1, characterized in that a connecting piece is integrally connected between the front backrest piece and the front seat cushion piece, the connecting piece is put into a gap between the backrest of the seat and the seat portion to fix the car seat cover.

7. The car seat cover according to claim 1, characterized in that
a non-slip coating is provided on the back face of the car seat cover by screen printing or drip molding.

8. A method for knitting a car seat cover, comprising:
knitting a headrest portion by cubic knitting, a lower opening of the headrest portion being tightened and being releasable;
knitting a front backrest piece by cubic knitting, sides of the front backrest piece being knitted by return knitting and by adjusting the knitting tightness;
connecting a rear backrest piece to the two sides of the front backrest piece;
connecting a front seat cushion piece to a lower portion of the front backrest piece; and
knitting a seat cushion skirt portion at an edge of the front seat cushion piece by cubic knitting, sides of the seat cushion skirt portion being knitted by return knitting and by adjusting the knitting tightness;
wherein a number of pre-opening positions are formed on the car seat cover, the pre-opening positions being a single-sided knitted structure; and
a number of hook and loop fastening tapes are further provided on the car seat cover to tie up the pre-opening positions on the car seat cover.

9. The method for knitting a car seat cover according to claim 8, characterized in that the two sides of the front backrest piece and the rear backrest piece are stitched together; or
the front backrest piece and the rear backrest piece are integrally knitted.

10. The method for knitting a car seat cover according to claim 8, further comprising a step of knitting a connecting piece: knitting a connecting piece in a lower portion of the front backrest piece, and knitting a front seat cushion piece in a lower portion of the connecting piece.

* * * * *